United States Patent [19]
Wood et al.

[11] Patent Number: 5,858,163
[45] Date of Patent: Jan. 12, 1999

[54] APPARATUS FOR MAKING OPHTHALMIC LENSES BY VACUUM LAMINATION

[75] Inventors: Kenneth O. Wood, West Stafford, Conn.; David J. Logan, Monterey, Mass.; Alexander Flavio Incera, Pomfret Ctr, Conn.

[73] Assignee: Gerber Optical, Inc., South Windsor, Conn.

[21] Appl. No.: 620,468

[22] Filed: Mar. 22, 1996

[51] Int. Cl.$^6$ .............................. B32B 31/04; B32B 31/28
[52] U.S. Cl. ................... 156/350; 156/379.6; 156/379.8; 156/382
[58] Field of Search .................................... 156/102, 103, 156/104, 105, 286, 379.6, 379.8, 381, 382, 497, 500, 537, 350, 361; 264/1.7; 425/388, 405.1, 504, 808, DIG. 60

[56] References Cited

U.S. PATENT DOCUMENTS

| | | | |
|---|---|---|---|
| 1,909,444 | 8/1933 | Worral | 156/105 |
| 3,383,265 | 5/1968 | Garabedian | 156/366 |
| 3,405,019 | 10/1968 | Seil et al. | 156/105 |
| 3,472,721 | 10/1969 | Abramson et al. | 156/272 |
| 3,769,133 | 10/1973 | Halberschmidt et al. | 156/286 |
| 3,912,542 | 10/1975 | Hirano et al. | 156/104 |
| 4,038,014 | 7/1977 | Dusza et al. | 425/388 |
| 4,106,187 | 8/1978 | Smith | 29/847 |
| 4,180,426 | 12/1979 | Oustin et al. | 156/104 |
| 4,258,156 | 3/1981 | Guerrini et al. | 525/531 |
| 4,349,374 | 9/1982 | Rupp | 65/107 |
| 4,421,589 | 12/1983 | Armini et al. | 156/382 |
| 4,504,341 | 3/1985 | Radzwill et al. | 156/102 |
| 4,645,317 | 2/1987 | Frieder et al. | 351/172 |
| 4,781,452 | 11/1988 | Ace | 351/77 |
| 4,867,553 | 9/1989 | Frieder | 351/172 |
| 4,883,548 | 11/1989 | Onoki | 156/99 |
| 4,927,480 | 5/1990 | Vaughan | 156/228 |
| 4,954,206 | 9/1990 | Voss | 156/537 |

(List continued on next page.)

FOREIGN PATENT DOCUMENTS

| | | | |
|---|---|---|---|
| 63-276542 | 11/1988 | Japan | B32B 31/20 |
| 08156099 | 6/1996 | Japan | B29C 65/48 |
| 2 253 917 | 9/1992 | United Kingdom | G02B 7/02 |
| WO 90/12338 | 10/1990 | WIPO | G02C 7/04 |
| WO 95/23062 | 8/1995 | WIPO | B32B 15/08 |
| WO 95/23351 | 8/1995 | WIPO | G02C 13/00 |

OTHER PUBLICATIONS

Untitled literature describing the manufacture of eyeglass lenses, pp. 15–34 (dated more than one year prior to the filing date of this application).

Sola Optical USA, "Owner's Manual for the Matrix® Lens Processing System, Version 1.5", Oct. 1995.

European Search Report from the corresponding European application citing the above–listed references.

Laminated Plastics, D.J. Duffin, Reinhold Publishing Corporation, pp. 72–77, 1958.

*Primary Examiner*—Richard Crispino
*Attorney, Agent, or Firm*—McCormick, Paulding & Huber

[57] ABSTRACT

An apparatus is provided for making ophthalmic lenses by vacuum lamination wherein a front lens wafer is laminated to a back lens wafer with a layer of adhesive disposed within the interface between the two wafers forming a composite lens. An upper flexible, transparent sheet is located on the top side of the composite lens, a lower flexible, opaque or transparent sheet is located on the bottom side of the composite lens, and a seam is formed between the upper and lower flexible sheets which defines an evacuation chamber between the sheets for receiving the composite lens. A vacuum pump is connected in fluid communication with the evacuation chamber for evacuating air from the chamber and in turn drawing the upper and lower flexible sheets into engagement with the top and bottom sides of the composite lens, respectively, to press the lens wafers together and spread the adhesive throughout the wafer interface. A UV lamp is mounted above the composite lens for transmitting UV radiation through the upper flexible sheet and into the adhesive layer to cure the adhesive and form the composite lens.

30 Claims, 2 Drawing Shee

U.S. PATENT DOCUMENTS

| | | | |
|---|---|---|---|
| 4,969,729 | 11/1990 | Merle | 351/168 |
| 4,989,316 | 2/1991 | Logan et al. | 29/527 |
| 5,028,358 | 7/1991 | Blum | 264/1.4 |
| 5,070,657 | 12/1991 | Brule et al. | 51/277 |
| 5,154,861 | 10/1992 | McBrierty et al. | 264/1.4 |
| 5,162,825 | 11/1992 | Kamekura et al. | 351/163 |
| 5,190,992 | 3/1993 | Kato et al. | 522/180 |
| 5,223,862 | 6/1993 | Dasher et al. | 351/163 |
| 5,253,111 | 10/1993 | Chiba et al. | 359/647 |
| 5,288,221 | 2/1994 | Stoerr et al. | 425/125 |
| 5,316,462 | 5/1994 | Seeman | 425/405.1 |
| 5,399,227 | 3/1995 | Abrams | 156/539 |
| 5,433,810 | 7/1995 | Abrams | 156/273.7 |
| 5,439,642 | 8/1995 | Hagmann et al. | 422/22 |
| 5,447,684 | 9/1995 | Williams | 422/20 ts |

APPARATUS FOR MAKING OPHTHALMIC LENSES BY VACUUM LAMINATION

FIELD OF THE INVENTION

The present invention relates to apparatus and methods for making optical lenses having at least two lens elements or wafers laminated together to form a compound lens, and more particularly, to such apparatus and methods for pressing the lens wafers together to spread an adhesive throughout an interface between the wafers and for curing the adhesive to form a laminated assembly.

BACKGROUND INFORMATION

Prescription eyeglass lenses have conventionally been produced by providing a pair of lens blanks, of glass or plastic, having two major lens surfaces. One of these surfaces is cut with a grinding tool to generate a lens surface having a shape closely approximating that of the prescribed lens. The ground lens surface is then fined by rubbing this surface with a lap having an abrasive surface to create a surface form that meets the prescription, and the fined surface is then polished to optical clarity. If desired, the lens may then be coated for tinting, anti-reflection, scratch resistance, etc.

One of the drawbacks of this conventional approach is that it is relatively time consuming and requires a significant amount of expertise and expense. Although computer-controlled machinery has been developed and is now widely used to quickly generate, fine and polish lens blanks to meet any prescription, this equipment is relatively expensive, preventing its use by most optometrists and/or merchants. Accordingly, rather than stock eyeglass lenses for all potential customers' prescriptions, these individuals and/or companies have been required to order lenses for many prescriptions from a distant laboratory or manufacturer, requiring their customers to wait one or more days to receive their eyeglasses.

In an attempt to avoid these and other drawbacks associated with conventional eyeglass lens production, several manufacturers have been working to develop wafer lamination systems wherein a front lens wafer and a back lens wafer are laminated together to form a composite lens. Each wafer is provided in finished and polished form so as to provide selected optical properties. In order to produce a particular prescription lens, selected front and back wafers are combined and aligned relative to each other so that the combined optical properties of the wafers form the prescribed lens. The primary advantage of this type of system is that a relatively small inventory of wafers may be stocked and used to make composite lenses satisfying hundreds of thousands of multi-focal and single-vision prescriptions. In addition, the wafers may be pre-tinted, or pre-coated with, for example, an anti-reflection or scratch-resistant coating, thus avoiding the need to send the lenses to a distant laboratory or like facility to apply such a coating as is now frequently required.

In a typical wafer lamination system, a composite lens is formed by placing the selected front lens wafer into a lens holder with its concave or back side facing up. A predetermined quantity of adhesive is then applied to the back side of the front wafer, and the convex or front side of a selected back lens wafer is then superimposed over the front wafer and aligned relative to the front wafer in accordance with the requirements of a particular prescription. The two lens wafers are then squeezed together to spread the adhesive throughout the interface between the wafers.

In conventional wafer lamination systems, mechanical clamping or pressing devices have been employed to press the lens wafers together. In other such systems, pneumatic pressure has been applied by superimposing an inflatable bladder over the lens assembly and inflating the bladder so that it engages and presses the lenses together against a compliant support surface. These types of prior art devices require relatively precise shape, construction, and positioning to provide uniform application of pressure and avoid distortion of the wafer pair.

Most current wafer lamination systems use an adhesive which is cured by exposure to ultraviolet (UV) light for bonding the lens wafers, and this is typically done during the step of pressing the wafers together. Accordingly, the mechanical pressing devices typically require an optically-transparent window, and the inflatable bladders have likewise been made of transparent materials to permit the transmission of UV light into the lens assembly when pressing the lenses together. One of the drawbacks of these current wafer lamination systems is that the inflatable bladder structures and transparent window assemblies may absorb a substantial portion of the UV light, thereby increasing the time required to cure the adhesive. In addition, the adhesive typically has oxygen-inhibited activators and thus any adhesive that spreads onto the edge surface areas of the wafer lamination remains in a wet or waxy state after curing. The wet adhesive may in turn be transferred by contact to the surfaces of the pressing devices, or to other components of the lamination system, requiring time-consuming clean up between lamination procedures. In addition, many current wafer lamination systems require extensive operator handling of the wafers, which likewise leads to contamination and/or damage to the wafers, particularly when operators are required to handle wafers having uncured adhesive on their edge surface areas.

Accordingly, it is an object of the present invention to overcome many of the drawbacks and disadvantages of such prior art wafer lamination systems.

SUMMARY OF THE INVENTION

The present invention is directed to an apparatus and method for making ophthalmic lenses by vacuum lamination wherein a front lens wafer is laminated to a back lens wafer with a layer of adhesive disposed within the interface between the two wafers forming a composite lens. The apparatus comprises a first flexible, transparent sheet located on a first side of the composite lens, a second flexible, opaque or transparent sheet located on a second side of the composite lens, and a substantially air-tight seal formed between the first and second flexible sheets and defining a sealed evacuation chamber between the flexible sheets for receiving the composite lens. A vacuum pump is coupled in fluid communication with the evacuation chamber for evacuating air from the chamber and in turn drawing the first and second flexible sheets into engagement with the composite lens received within the chamber to press the lens wafers together and spread the adhesive throughout the wafer interface. A UV lamp or like radiation source is mounted adjacent to the evacuation chamber for transmitting UV radiation through one of the transparent sheets and into the adhesive layer to cure the adhesive and form the composite lens.

One advantage of the apparatus and method of the present invention, is that atmospheric pressure is substantially uniformly applied across opposite sides of the composite lens to press the lens wafers together and spread the adhesive throughout the wafer interface. Accordingly, the pressing devices and/or pneumatic bladders employed in the prior art lamination systems to press the lens wafers together are avoided. In addition, because the evacuation chamber is substantially evacuated of air, adhesives employing oxygen-inhibited activators may be fully cured, thus avoiding the wet or waxy edge surface areas on the composite lenses that have been caused by exposure to oxygen in prior art wafer lamination systems.

Other objects and advantages of the present invention will become apparent in view of the following detailed description and accompanying drawings.

DETAILED DESCRIPTION OF THE PREFERRED EMBODIMENTS

Figure 1:
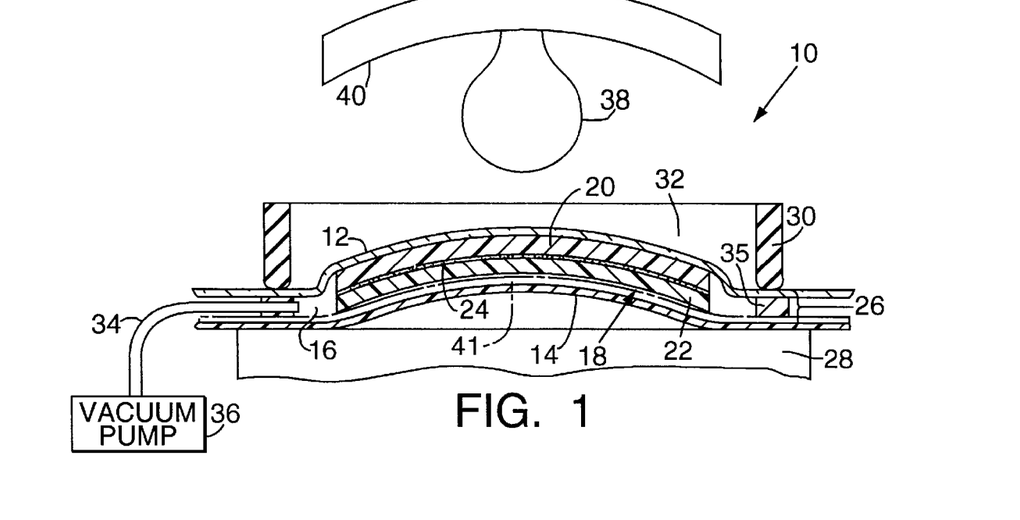
FIG. 1 is a partial schematic illustration of a first embodiment of an apparatus for laminating a composite lens under vacuum in accordance with the present invention.

In FIG. 1, an apparatus embodying the present invention for laminating a composite lens under vacuum is indicated generally by the reference numeral 10. The apparatus 10 comprises a first or upper flexible, transparent sheet 12 and a second or lower flexible, transparent (or opaque) sheet 14 defining an evacuation chamber 16 located between the two sheets for receiving a composite lens 18. The composite lens 18 is formed by a front lens wafer 20 defining a generally concave back surface, and a back lens wafer 22 defining a generally convex front surface substantially conforming in shape to the back surface of the front wafer. As shown in FIG. 1, the back surface of the front lens wafer 20 is superimposed over the front surface of the back lens wafer 22, and a layer of adhesive 24 is disposed within the interface of the two wafers to bond them together and form the composite lens.

In order to permit evacuation of the chamber 16, a substantially air-tight seal or seam 26 is formed between the first and second transparent sheets 12 and 14, respectively, and extends about the periphery of the composite lens 18. The lower sheet 14, composite lens 18 and upper sheet 12 are supported on a flat support surface 28, and a circular backing ring or plate 30 defining a central aperture 32 is seated against the upper sheet 12 and surrounds the composite lens 18 and evacuation chamber 16. As shown in FIG. 1, the backing ring 30 presses the upper sheet 12 toward the lower sheet 14 and support surface 28 to form the substantially air-tight seal 26 extending about the periphery of the composite lens.

A vacuum tube 34 is connected on one end to a vacuum pump 36, and extends on the other end through the seam 26 and into the evacuation chamber 16. A spacer ring 35 may be interposed between the sheets beneath the backing ring 30 to facilitate the formation of a uniform seam and allow connection of the vacuum tube 34 through a hole extending radially through the ring. Alternatively, the spacer ring 35 may not be employed, and the seam 26 may be formed by pressing the upper sheet 12 into engagement with the lower sheet 14 with the backing ring 30. As indicated in FIG. 1, the backing ring 30 may be made of a flexible, polymeric material in order to conformably engage the upper sheet and maintain the integrity of the seam. If necessary, the backing ring 30 may be weighted by, for example, attaching a metal ring (not shown) to the upper side of the backing ring, or may otherwise be pressed or clamped into engagement with the upper sheet 12 so as to form an air-tight seam 26 about the periphery of the composite lens 18. When the spacer ring 35 is not used, the vacuum tube 34 is preferably formed of a flexible, polymeric material in order to permit deformation of the tube under the pressure applied by the backing ring to facilitate the formation of an air-tight seam.

In the operation of the apparatus of the present invention, a predetermined quantity of adhesive is applied to the back surface of the front lens wafer 20, and the front surface of the back lens wafer 22 is then superimposed over the back surface of the front lens wafer to initially form the composite lens, as shown in FIG. 1. Gravitational forces and capillary action cause the adhesive to partially spread into the wafer interface; however, it is then necessary to press the lens wafers together to squeeze and in turn spread the adhesive throughout the interface. Accordingly, the composite lens 18 is then placed between the first and second flexible sheets within the evacuation chamber 16, and the backing ring 30 is seated against the upper sheet 12 over the spacer ring 35, to in turn press the upper sheet, spacer ring and lower sheet against the support surface 28 to form the substantially air-tight seam 26. With the vacuum tube 34 inserted through the spacer ring, the vacuum pump 36 is then actuated to evacuate air from the chamber 16, which in turn draws the upper flexible sheet 12 and lower flexible sheet 14 into engagement with opposite sides of the composite lens to thereby press the lens wafers together and squeeze the adhesive throughout the interface. Because the evacuation chamber 16 is substantially entirely evacuated of air, atmospheric pressure (approximately 14.7 psig) is uniformly applied across opposing sides of the composite lens to press the wafers together and spread the adhesive throughout the interface.

In the preferred embodiment of the present invention, the adhesive is UV activated, and therefore a UV lamp 38 and appropriate reflector 40 are mounted over the composite lens 18 to transmit UV radiation into the wafer interface and cure the adhesive. The composite lens may be inverted from the orientation shown in FIG. 1, if necessary, to permit exposure to the radiation through the back wafer. In order to prevent unnecessary absorption of the UV radiation prior to transmission into the adhesive layer 24, the upper sheet 12 (or the sheet located between the composite lens and WU lamp) is made of a relatively thin, transparent material, such as a film made of polyvinylidene chloride or other polymeric material preferably having a thickness of between approximately 0.0005 and 0.005 inch. Accordingly, the thin transparent sheets contemplated by the present invention will not only decrease the time currently required to cure the adhesive, but will be inexpensive enough to be disposed of after each use, thus preventing contamination of the next succeeding composite lens with uncured adhesive or other particles or debris, and avoiding the time and expense associated with having to clean the prior art equipment between laminating composite lenses. In addition, although the sheet located between the UV lamp and composite lens should be transparent to minimize UV absorption, the other sheet does not necessarily have to be transparent, and may be opaque if desired.

Another advantage of the apparatus of the present invention is that the vacuum pump 36 may be employed to evacuate substantially all of the air from the chamber 16, thus avoiding the wet or waxy edge surface areas on the composite lenses that have been caused by exposure of excess adhesive to oxygen in the prior art wafer lamination systems. If desired, or as an alternative to completely evacuating the chamber 16, the chamber may be purged with an inert gas, such as nitrogen, to further eliminate the presence of oxygen in the vicinity of the composite lens.

As will be recognized by those skilled in the pertinent art, the first and second flexible sheets and the substantially air-tight seal or seam extending about the periphery of the composite lens may take numerous different configurations to form the evacuation chamber 16. For example, the seam 26 may be formed by heat sealing the first and second sheets along a line of joinder defining the seam, or one of the sheets may be supplied with a tacky adhesive along the line of joinder and the other sheet may then be pressed against the adhesive to form the substantially air-tight seal. The sheets may similarly be provided in the form of a plastic bag defining an opening along one edge for receiving the composite lens, and the opening may in turn be sealed in any of numerous ways known to those skilled in the pertinent art in order to evacuate the enclosure and draw the opposite sides of the bag into engagement with the composite lens as described above. One advantage of providing the sheets in the form of a plastic bag or creating a bag through heat sealing, is that once the adhesive is cured by exposure to UV radiation, the composite lens may be retained in the bag for further handling to avoid contamination.

As will also be recognized by those skilled in the pertinent art, it may be desirable to provide means for facilitating evacuation of the chamber 16. For example, as indicated in broken lines in FIG. 1 a layer 41 of porous or mesh-like material may be interposed between at least one of the flexible sheets (such as the lower flexible sheet 14, as shown) and the composite lens to permit the complete evacuation of air from the chamber, if necessary, after the sheets 12 and 14 are drawn into at least partial engagement with the composite lens. As an alternative to a mesh-like material, a thin layer of open-cell foam or other type of material defining one or more air-flow passages across the interface between the composite lens and at least one flexible sheet may be used to facilitate the evacuation of gases from the chamber 16. As another alternative, either or both of the flexible sheets may be formed with one or more raised surface areas and adjacent depressed surface areas or equivalent surface texture defining flow channels across the interface of the composite lens and respective sheet.

Figure 2:
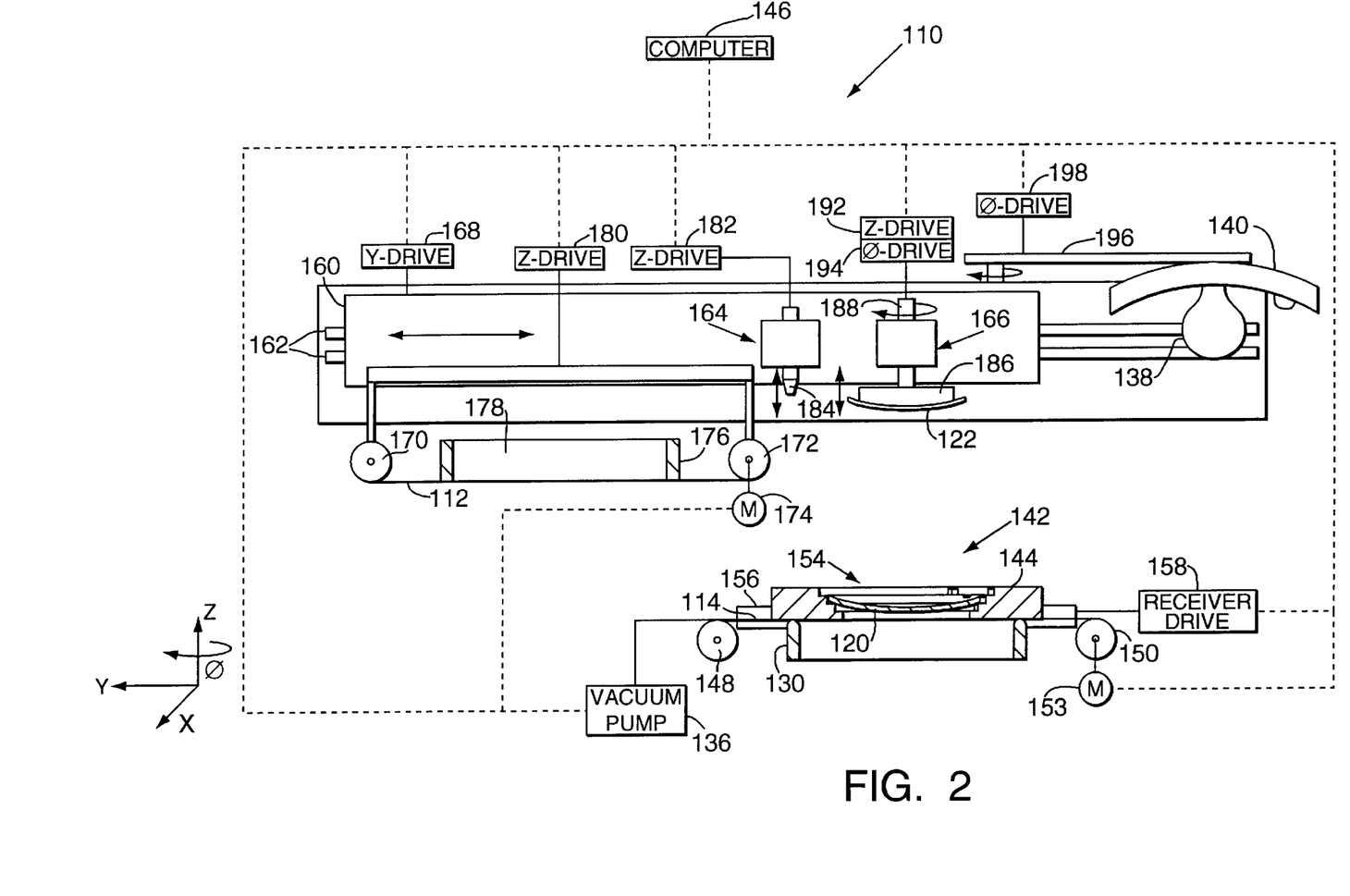
FIG. 2 is a schematic illustration of a second embodiment of an apparatus for laminating a composite lens in accordance with the present invention.
Figure 3:
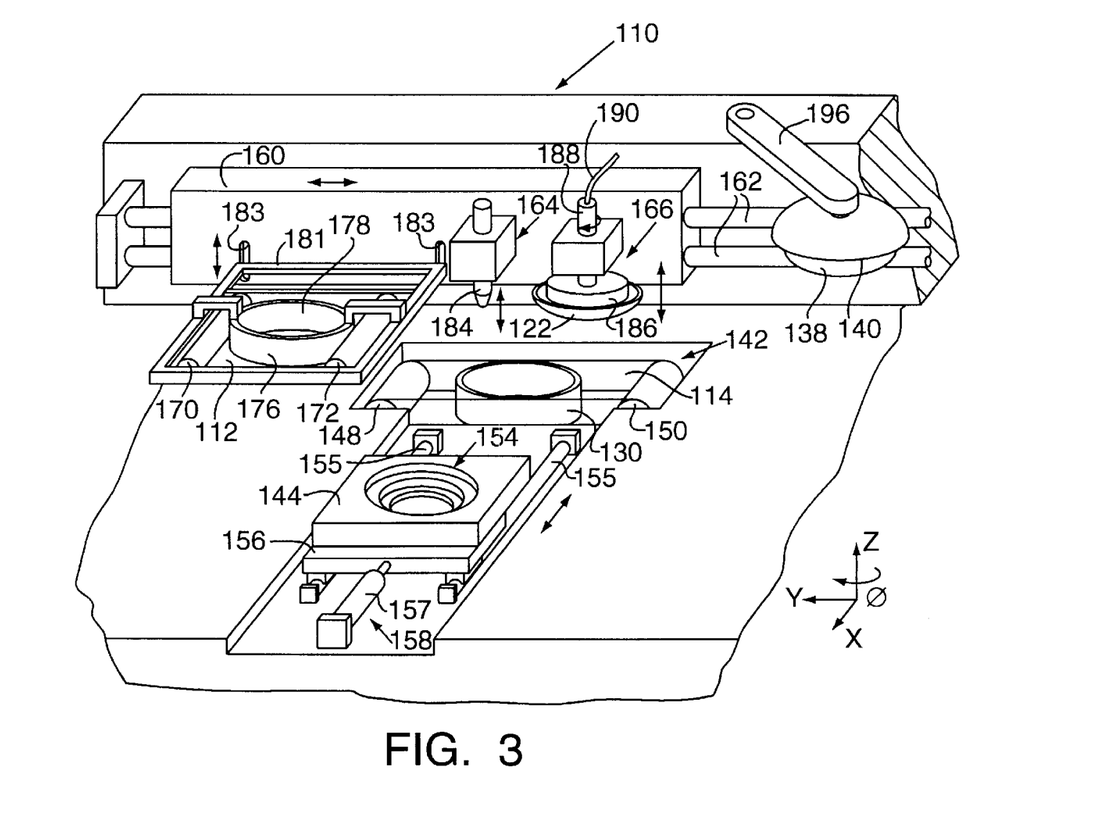
FIG. 3 is a perspective view of the apparatus of FIG. 2 with certain components removed for clarity.

Turning to FIGS. 2 and 3, another apparatus embodying the present invention for making composite lenses by vacuum lamination is indicated generally by the reference numeral 110. The apparatus 110 may employ each of the same components, or components corresponding to those of the apparatus 10 described above with reference to FIG. 1, and therefore like reference numerals preceded by the numeral 1 are used to indicate like elements. A primary difference of this embodiment is that it is designed for automated lamination of composite lenses.

As indicated in FIGS. 2 and 3, the apparatus 110 comprises means for indexing at least one of the first and second sheets for providing a fresh section of the respective sheet for each composite lens. More specifically, in the preferred embodiment, the upper flexible sheet 112 and lower flexible sheet 114 are supplied as indexable rolls for passage through a laminating station 142 so that a fresh portion of each sheet may be used for laminating each composite lens. As described in further detail below, an operator places each of the front and back lens wafers into a lens holder or receiver 144, and the apparatus 110 then automatically processes each lens wafer to form a composite lens in accordance with a respective prescription under the control of a computer 146 (FIG. 2).

The lower sheet 114 is provided on a supply spool 148 and is wound onto a take-up spool 150. In this embodiment of the invention, the compliant ring 130 is mounted below the lower sheet 114 within the laminating station 142, and the lower supply and take-up spools are mounted on diametrically opposite sides of the ring relative to each other. As shown in FIG. 2, the apparatus 110 further comprises means for driving the indexable rolls (or indexing means) including a take-up motor 153 drivingly connected to the take-up spool and actuated by the computer 146 to rotatably drive the take-up spool and feed a fresh portion of the lower sheet 114 into the laminating station prior to laminating each set of lens wafers.

The receiver 144 is described in further detail in co-pending patent application Ser. No. 08/620,469 entitled "Ophthalmic Lens Wafers And Receiver For Registering Such Wafers", which was filed in the U.S. Patent and Trademark Office on Mar. 22, 1996, is assigned to the Assignee of the present invention, and is hereby expressly incorporated by reference as part of the present disclosure. As shown in FIGS. 2 and 3, the receiver 144 defines a stepped recess 154 for receiving either a front or back lens wafer, wherein each step is dimensioned to receive a respective type of wafer. Currently, wafers are provided in 65, 70 and 75 mm diameters, and therefore the receiver defines three steps and each step corresponds in diameter to a respective size of wafer. The receiver is mounted on a carriage 156 which is drivingly mounted for carrying the receiver and lens wafers into and out of the laminating station 142, as indicated by the arrows in FIG. 3.

As further indicated in FIG. 2, the receiver carriage 156 is drivingly connected to a suitable drive system 158 for moving the carriage and receiver into and out of the laminating station under the control of the computer 146. With reference to FIG. 3, the drive system 158 may include a pair of ways or rails 155 for slidably supporting the receiver carriage 156, and an actuator 157, such as pneumatic cylinder, connected to the carriage for moving the carriage on the ways toward and away from the laminating station 142.

As will be recognized by those skilled in the pertinent art, the carriage 156 may be adapted to hold a single receiver, as shown in FIG. 2, or alternatively, the carriage may be adapted to hold two receivers side by side, wherein one receiver would be provided for the front lens wafer and the other receiver would be provided for the back lens wafer for each composite lens. Similarly, a single receiver may be provided with a plurality of stepped recesses, wherein the keys of each stepped recess correspond to a respective wafer type. As another alternative, the receiver may be provided with retractable keys, and means for selecting and actuating the keys or key pairs corresponding to the particular type of lens wafer to be loaded into the receiver, as further described in the above-mentioned co-pending patent application.

The front lens wafers 120 are preferably provided with a "front" notch pattern on the edge of each front wafer and the back lens wafers 122 are likewise provided with a "back" notch pattern different than the front notch pattern on the edge of each back wafer. Correspondingly, each "front" lens receiver is preferably provided with one or more keys on each step of the respective stepped recess 154, and the keys are dimensioned to fit within the front notch pattern, but not the back notch pattern of the lens wafers. Similarly, each "back" lens receiver is preferably provided with one or more keys on each step of the respective stepped recess which are dimensioned to fit within the back notch pattern, but not the front notch pattern of the lens wafers. Accordingly, the notch and key system will prevent an operator from placing the wrong lens wafer into a receiver, or from placing a lens wafer incorrectly (e.g., upside down or having the wrong angular orientation) in the receiver.

As shown in FIGS. 2 and 3, a y-carriage 160 is mounted on drive rails or ways 162 extending in the illustrated y-coordinate direction over the laminating station 142. The y-carriage 160 carries the spool assembly for the upper sheet 112, a glue dispenser 164, and a plunger and upper lens holder assembly 166. As shown in FIG. 2, a y-drive system 168 is drivingly connected to the y-carriage 160 for moving the carriage under the control of the computer 146 in the y-coordinate direction, and in turn driving each of the illustrated components mounted on the carriage into and out of the laminating station 142. The y-drive system 168 may be any of numerous known systems for driving the carriage along its rails, such as a belt and pulley, rack and pinion, or lead screw arrangement.

The upper sheet 112 is provided on a supply spool 170 and is wound onto a take-up spool 172 under the control of the computer 146 by a take-up motor 174, which is drivingly connected to the take-up spool to provide a fresh section of the upper sheet prior to laminating each set of lens wafers. An upper backing ring 176 defining a central aperture 178 is supported on the y-carriage above the upper sheet 112 so that when positioned in the laminating station 142, the backing upper ring may be lowered into engagement with the upper sheet to in turn press the upper sheet against the lower sheet and lower backing ring 130 to form the approximately air-tight seal and evacuation chamber. As will be recognized by those skilled in the pertinent art, a spacer ring like the ring 35 of FIG. 1, may be interposed between the sheets to facilitate the formation of a uniform air-tight seam, as described above. The central aperture 178 of the upper backing ring is provided to permit the unobstructed transmission of UV radiation through the upper sheet and into the lens assembly to cure the adhesive, as is described further below. As will be recognized by those skilled in the pertinent art, both the upper sheet 112 and its supply and take-up spools may be mounted within a cassette adapted to be replaceably mounted on the y-carriage, and similarly, the lower sheet 114 and its supply and take-up spools may be mounted within a cassette adapted to be replaceably mounted in the laminating station for facilitating replacement of the upper or lower sheets when depleted. Similarly, a suitable encoder or like sensor may be mounted to one or both take-up motors or to selected spools to permit the computer 146 to monitor the amount of each sheet used and signal to the operator when necessary to replenish one of the sheets or replace its cassette.

As shown in FIG. 2, the upper sheet and backing ring assembly includes a z-drive system 180 for moving the upper sheet and backing ring upper up and down in the z-coordinate direction under the control of the computer 146 when located within the laminating station 142. As shown in FIG. 3, the upper backing ring and spools are mounted on a frame 181 which is in turn supported by the y-carriage 160 through elongated slots 183 extending through the carriage for moving the backing ring and spool assembly in the z-coordinate direction. The z-drive system 180 may be connected to the frame 181 within the y-carriage and constructed in accordance with any of numerous known systems, such as one or more pneumatic cylinders, a solenoid-actuated plunger, or one or more electric motors with a suitable gear train coupled between the motor and the frame 181.

The glue dispenser 164 is preferably a step-motor driven or like dispenser of a type known to those skilled in the pertinent art, which is actuated under the control of the computer 146 to dispense a predetermined amount of adhesive depending upon, for example, the type of adhesive and the size of the lens wafers. AS shown in FIG. 2, a z-drive system 182 is drivingly connected to the glue dispenser to move the dispenser tip 184 under the control of the computer 146 in the z-coordinate direction when located in the laminating station to apply adhesive to the lens wafers, as is described further below. The z-drive system 182 may be the same as the z-drive 180 for driving the backing ring and upper spool assembly, or if desired, may be a different type of drive system known to those skilled in the pertinent art.

The plunger and upper lens holder assembly 166 comprises a suction cup 186 mounted on one end of a plunger shaft 188 for lifting the lens wafers by suction. As shown in FIG. 3, a pneumatic line 190 may be connected to one end of the plunger shaft, which in turn defines an air conduit (not shown) coupled in fluid communication between the pneumatic line and the suction cup 186. The pneumatic line 190 is connected on its other end through one or more computer-controlled valves (not shown) to the vacuum pump 136 (FIG. 2), or to another vacuum source to draw air through the suction cup, and in turn lift and support one or more lens wafers under the control of the computer 146 within the laminating station 142. As indicated in FIG. 2, a z-drive system 192 is drivingly connected to the plunger shaft 188 to move the plunger and suction cup in the z-coordinate direction under the control of the computer 146. The z-drive 192 may be the same type as the other z-drives shown, or may be another type known to those skilled in the pertinent art. A $\phi$-drive system 194 is also drivingly connected to the plunger shaft 188 to rotate the plunger shaft and suction cup under the control of the computer 146 about the $\phi$-axis, as indicated by the arrows in FIGS. 2 and 3, in order to align the lens wafers relative to each other in accordance with a particular prescription, as is described further below. The $\phi$-drive 194 may be constructed in accordance with numerous known drive systems, such as with a toothed belt and pulley, or suitable gear train mounted on the y-carriage 160 and drivingly connected to the plunger shaft 188.

As also shown in FIGS. 2 and 3, the UV lamp 138 and reflector 140 are mounted on a swing arm 196 pivotally mounted over the laminating station 142 for moving the lamp and reflector assembly into and out of the laminating station as required to cure the adhesive layer of each composite lens. As indicated in FIG. 2, a $\phi$-drive system 198 is drivingly connected to the swing arm 196 to control the pivotal movement of the swing arm about the $\phi$-axis under the control of the computer 146. In the embodiment of the present invention illustrated, the UV lamp 138 is an approximately 400 Watt lamp, and is provided with one or more cooling fans (not shown). This power rating is only exemplary, however, and may be changed as necessary to meet the requirements of a particular system. Although not shown, the laminating station 142 and UV lamp 138 will preferably be enclosed within suitable UV shielding in a manner known to those skilled in the pertinent art in order to prevent the operators from receiving unnecessary UV exposure.

In the operation of the apparatus 110, an operator first places a back lens wafer 122 within the stepped recess 154 of a back lens receiver 144, and aligns the notches on the lens wafer with the keys in the corresponding step of the recess to ensure that the wafer is properly seated within the receiver. The computer 146 then controls the components of the apparatus 110 as hereinafter described to automatically laminate the selected lens wafers to form prescription composite lenses.

First, the receiver drive 158 is actuated to move the receiver and back lens wafer into the laminating station 142, and the y-drive system 168 is actuated to move the y-carriage 160 in the y-direction, and in turn position the plunger and upper lens holder assembly 166 within the laminating station. The z-drive 192 is then actuated to move the plunger shaft 188 downwardly in FIGS. 2 and 3 into engagement with (or spaced immediately above) the concave side of the back lens wafer, and the suction cup 186 is connected in fluid communication with the vacuum source to draw the lens wafer into engagement with the suction cup. The plunger shaft 188 is then driven upwardly in FIG. 2 to lift the back lens wafer above the receiver, and the receiver is moved away from the laminating station and replaced with a front lens receiver 144. Alternatively, if the receiver is provided with retractable keys, the computer actuates the keys so as to retract the back wafer keys and insert the appropriate front wafer keys into the stepped recess to receive the front wafer.

The operator then places the selected front lens wafer 120 into the stepped recess 154 of the receiver, and aligns the notches on the front lens wafer with the keys in the corresponding step of the recess to ensure that the wafer is properly seated within the receiver. The computer 146 then actuates the receiver drive 158 to move the front lens wafer into the laminating station. At about the same time, the y-drive 168 is actuated to move the y-carriage to the right in FIG. 2 to position the adhesive dispenser 164 in the laminating station over the approximate center of the front lens wafer 120. The z-drive 182 is then actuated to move the dispenser tip 184 downwardly into engagement with the concave side of the front wafer, and a predetermined amount of adhesive is dispensed onto the wafer under the control of the computer 146. Once the adhesive is dispensed, the z-drive 182 is actuated to lift the adhesive dispenser upwardly in FIG. 2, and the y-drive 168 is then actuated to move the y-carriage to the left in FIG. 2 to place the back lens wafer 122 over the front lens wafer 120. The φ-drive 194 is then actuated under the control of the computer 146 to rotate the back lens wafer about the φ-axis in order to angularly align the back lens wafer with the front lens wafer in accordance with the particular lens prescription. Once the wafers are rotatably aligned, the z-drive 192 is actuated to move the back lens wafer 122 downwardly in FIG. 2 into engagement with the adhesive on the front lens wafer. As described above, at this point the adhesive begins to spread into the wafer interface by capillary action, and is sufficient to hold the front lens wafer to the back lens wafer when lifted by the plunger and suction cup assembly. After allowing time for the adhesive to spread between the wafers, the z-drive 192 is actuated to move the plunger upwardly so that both lens wafers are lifted upwardly in FIG. 2 over the receiver 144.

With the lens wafer assembly suspended in the laminating station, the receiver drive 158 is actuated to move the receiver 144 out of the laminating station, and the z-drive 192 is then actuated to lower the lens wafers onto the lower flexible sheet 114. The vacuum source 136 is then disengaged from the suction cup 186, and the z-drive 192 is actuated to lift the suction cup upwardly in FIG. 2 away from the composite lens. The y-drive 168 is then actuated to move the y-carriage to the right in FIG. 2 and position the upper sheet 112 and backing ring 178 within the laminating station over the composite lens. The z-drive 180 is then actuated to move the upper sheet 112 and upper backing ring 176 downwardly so that the upper backing ring rests against the lower backing ring 130, and in turn presses the upper sheet against the lower sheet to form the air-tight seam (like the seam 26 of FIG. 1.) extending about the periphery of the composite lens. The vacuum pump 136 is then actuated to evacuate the chamber formed within the air-tight seam, which in turn draws the upper sheet 112 and lower sheet 114 into engagement with the opposite sides of the composite lens to press the lens wafers together and spread the adhesive throughout the wafer interface. At about the same time, the φ-drive 198 is actuated to pivotally drive the swing arm, and in turn move the UV lamp 138 and reflector 140 over the laminating station.

As an alternative to immediately evacuating the chamber formed within the air-tight seal, it may be desirable to first partially evacuate the chamber for a predetermined period of time to allow the adhesive to initially spread throughout the wafer interface, and to then more fully evacuate the chamber to accomplish the final spread of the adhesive.

The UV radiation is then transmitted through the aperture 178 of the backing ring 176 and upper transparent sheet 112 for a predetermined time period in order to cure the adhesive layer spread throughout the interface. Once the curing time is expired (which, depending upon the power of the UV lamp, may be on the order of several seconds to several minutes), the swing arm is pivoted away from the laminating station (as shown in FIG. 2), the z-drive 180 is actuated to lift the upper sheet 112 and backing ring 178 upwardly in FIG. 2, and the take-up motor 153 is actuated to discharge the composite lens 118 to a discharge station located to the right of the lower sheet 114 in FIG. 3 and to simultaneously feed a fresh section of the lower sheet into the laminating station for laminating the next set of lens wafers. If excess adhesive at the rim of the lens binds the two sheets together, pressurized air or other gas can be introduced before operating the z-drive 180 to inflate the film "bag" and break any such adhesive bonds. The air may be provided by the vacuum or other pneumatic source, or if nitrogen or other gas is used to purge the enclosure prior to evacuation, this source may likewise be used to inflate the enclosure and break any such adhesive bonds. The take-up motor 174 is also then actuated to unwind a fresh section of the upper sheet 112, and the same procedure as described above is repeated for the next composite lens.

As will be recognized by those skilled in the pertinent art, numerous modifications may be made to the above-described and other embodiments of the present invention without departing from its scope as defined in the appended claims. Accordingly, this detailed description of preferred embodiments is to be taken in an illustrative as opposed to a limiting sense.

What is claimed is:

1. An apparatus for laminating a first lens wafer to a second lens wafer with a layer of adhesive disposed within the interface between the two lens wafers forming an ophthalmic composite lens, comprising:

a first flexible sheet located on a first side of the composite lens;

a second flexible sheet located on a second side of the composite lens;

a seal formed between the first and second flexible sheets and defining an enclosure between the flexible sheets for receiving the composite lens; and a vacuum pump coupled in fluid communication with the enclosure for evacuating air from the enclosure and in turn drawing the first and second flexible sheets into engagement with the composite lens received within the enclosure to press the lens wafers together and spread the adhesive through the wafer interface, wherein at least one of the first and second flexible sheets is provided on a supply spool and wound onto a take-up spool for providing a fresh section of the respective sheet for each composite lens.

2. An apparatus as defined in claim 1, further comprising a sealing member extending about the periphery of the composite lens, and pressing the first flexible sheet toward the second flexible sheet to form the seal.

3. An apparatus as defined in claim 1, wherein each of the first and second flexible sheets is provided on a respective supply spool and wound onto a respective take-up spool for providing a fresh section of each sheet for a composite lens.

4. An apparatus as defined in claim 1, further including a layer of porous material defining at least one air-flow passageway and disposed between the composite lens and at least one of the first and second flexible sheets for facilitating evacuation of the enclosure.

5. An apparatus as defined in claim 1, wherein at least one sheet defines a texture on at least one side thereof forming an air-flow passageway between the composite lens and said sheet.

6. An apparatus as defined in claim 1, wherein the seal is formed by heat bonding the two sheets along a line of joinder.

7. An apparatus as defined in claim 1, wherein at least one sheet is an elastomer membrane.

8. An apparatus for laminating a first lens wafer to a second lens wafer with a layer of radiation-curable adhesive disposed within the interface between the two lens wafers forming an ophthalmic composite lens, comprising:

a first flexible sheet located on a first side of the composite lens, and defining an external side and an internal side opposite the external side and facing the lens for conforming to a curvature of the lens;

a second flexible sheet located on a second side of the composite lens, and defining an external side and an internal side opposite the external side and facing the lens for conforming to a curvature of the lens;

means forming a seal between the first and second flexible sheets and for defining an enclosure between the internal sides of the sheets for receiving the composite lens;

means for evacuating air from the enclosure and drawing the first and second flexible sheets conformably against the composite lens received within the enclosure, and in turn pressing the lens wafers together to thereby spread the adhesive through the wafer interface;

means for permitting the transmission of radiation through at least one of the first and second flexible sheets and into the composite lens to cure the adhesive; and means for rotatably aligning at least one of the first and second lens wafers relative to the other in accordance with any of a plurality of different ophthalmic lens prescriptions.

9. An apparatus as defined in claim 8, wherein the means for evacuating includes a pump coupled in fluid communication with the enclosure for evacuating the enclosure.

10. An apparatus as defined in claim 8, wherein the means for permitting the transmission of radiation is defined by a transparent portion of at least one of the first and second flexible sheets extending adjacent to the enclosure for permitting the passage of radiation therethrough.

11. An apparatus as defined in claim 8, further comprising means for transmitting radiation through at least one of the first and second flexible sheets and into the composite lens to cure the adhesive.

12. An apparatus as defined in claim 11, further comprising:

a layer of ultraviolet-curable adhesive disposed within the interface between the two lens wafers and curable by exposure to ultraviolet radiation; and wherein (i) the means for transmitting radiation includes an ultraviolet radiation source; and (ii) the means for permitting the transmission of radiation is defined by a transparent portion of at least one of the first and second flexible sheets located adjacent to the enclosure.

13. An apparatus as defined in claim 8, further comprising means for dispensing a predetermined amount of adhesive into the wafer interface.

14. An apparatus for laminating a first lens wafer to a second lens wafer with a layer of radiation-curable adhesive disposed within the interface between the two lens wafers forming an ophthalmic composite lens, comprising:

a first flexible sheet located on a first side of the composite lens, and defining an external side and an internal side opposite the external side and facing the lens for conforming to a curvature of the lens;

a second flexible sheet located on a second side of the composite lens, and defining an external side and an internal side opposite the external side and facing the lens for conforming to a curvature of the lens;

means forming a seal between the first and second flexible sheets and for defining an enclosure between the internal sides of the sheets for receiving the composite lens;

means for evacuating air from the enclosure and drawing the first and second flexible sheets conformably against the composite lens received within the enclosure, and in turn pressing the lens wafers together to thereby spread the adhesive through the wafer interface;

means for permitting the transmission of radiation through at least one of the first and second flexible sheets and into the composite lens to cure the adhesive;

a laminating station receiving the first and second flexible sheets, and the composite lens within the enclosure formed between the first and second flexible sheets; and means for indexing at least one of the first and second flexible sheets within the laminating station and for providing a fresh section of the respective sheet for each composite lens.

15. An apparatus as defined in claim 14, wherein the first and second flexible sheets are each made of a polymeric film.

16. An apparatus as defined in claim 14, wherein the means for forming a seal includes a sealing member extending adjacent to the periphery of the composite lens for pressing at least one of the first and second flexible sheets toward the other to thereby form the seal.

17. An apparatus as defined in claim 16, wherein the sealing member is formed of a resilient material.

18. An apparatus as defined in claim 14, wherein the means forming the seal is defined by at least one heat-sealed portion forming a line of joinder between the first and second sheets.

19. An apparatus as defined in claim 14, further comprising a layer of adhesive extending between the first and second sheets along a line of joinder forming the seal.

20. An apparatus as defined in claim 14, further comprising means for facilitating evacuation of the enclosure.

21. An apparatus as defined in claim 20, wherein the means for facilitating evacuation includes at least one passageway defined between the composite lens and at least one of the first and second flexible sheets for permitting the flow of gas therethrough.

22. An apparatus as defined in claim 21, wherein the means for facilitating evacuation includes a layer of porous material disposed between the composite lens and at least one of the first and second flexible sheets and defining the at least one passageway therein.

23. An apparatus as defined in claim 21, wherein the at least one passageway is defined by a surface texture of at least one of the first and second flexible sheets.

24. An apparatus as defined in claim 14, further comprising first means for receiving and supporting each lens wafer, and second means for moving at least one lens wafer into and out of the first means for receiving and supporting the wafer.

25. An apparatus as defined in claim 24, wherein the second means includes a lens wafer support surface and means for drawing air through the lens wafer support surface and holding the at least one lens wafer thereon.

26. An apparatus as defined in claim 24, further comprising third means for controlling the second means to rotatably align at least one of the first and second lens wafers relative to the other in accordance with a selected one of a plurality of different ophthalmic lens prescriptions.

27. An apparatus as defined in claim 14, comprising means for indexing the first and second flexible sheets within the laminating station and for providing a fresh section of each sheet for each composite lens.

28. An apparatus for laminating a first lens wafer to a second lens wafer with a layer of radiation-curable adhesive disposed within the interface between the two lens wafers forming an ophthalmic composite lens, comprising:

a first flexible sheet located on a first side of the composite lens and conformable to a curvature of the lens;

a second flexible sheet located on a second side of the composite lens and conformable to a curvature of the lens;

means forming a seal between the first and second flexible sheets and for defining an enclosure between the sheets for receiving the composite lens;

means for permitting the transmission of radiation through at least one of the first and second flexible sheets and into the composite lens to cure the adhesive; and at least one supply spool for discharging at least one of the first and second flexible sheets, and at least one take-up spool for receiving a sheet from a respective supply spool.

29. An apparatus as defined in claim 28, further comprising first means for rotatably driving the at least one take-up spool, and second means for controlling the first means to provide a fresh section of sheet for a composite lens.

30. An apparatus for laminating a first lens wafer to a second lens wafer with a layer of radiation-curable adhesive disposed within the interface between the two lens wafers forming an ophthalmic composite lens, comprising:

a lens holder including a lens-support surface rotatably mounted on the apparatus and configured to support thereon and rotatably position at least one of the first and second lens wafers;

a drive motor drivingly coupled to the lens-support surface for rotatably driving the lens-support surface and in turn rotatably positioning the at least one lens wafer supported thereon;

a control unit electrically coupled to the drive motor, and configured to control the drive motor to rotatably align at least one of the first and second lens wafers relative to the other in accordance with any one of a plurality of different ophthalmic lens prescriptions to thereby form the composite lens in accordance with a selected one of the plurality of ophthalmic lens prescriptions;

a first flexible sheet locatable on a first side of the composite lens, and defining an external side and an internal side opposite the external side and facing the lens for conforming to a curvature of the lens;

a second flexible sheet locatable on a second side of the composite lens, and defining an external side and an internal side opposite the external side and facing the lens for conforming to a curvature of the lens;

a seal formed between the first and second flexible sheets and defining an enclosure between the internal sides of the flexible sheets for receiving the composite lens; and a vacuum pump coupled in fluid communication with the enclosure for evacuating air from the enclosure and in turn drawing the first and second flexible sheets conformably against the composite lens received within the enclosure to thereby press the lens wafers together and spread the adhesive through the wafer interface, wherein at least one of the first and second flexible sheets defines a transparent portion adjacent to the enclosure for permitting the transmission of radiation through the transparent portion and into the composite lens to cure the adhesive.

* * * * *